United States Patent [19]
Gillman et al.

[11] Patent Number: 5,867,498
[45] Date of Patent: Feb. 2, 1999

[54] INTELLIGENT TELECOMMUNICATIONS NETWORK

[75] Inventors: Ricahrd James Gillman; David Richard Griffiths, both of Suffolk, United Kingdom

[73] Assignee: British Telecommunications Public Limited, London, United Kingdom

[21] Appl. No.: 809,129

[22] PCT Filed: Sep. 14, 1995

[86] PCT No.: PCT/GB95/02176

§ 371 Date: Apr. 8, 1997

§ 102(e) Date: Apr. 8, 1997

[87] PCT Pub. No.: WO96/08909

PCT Pub. Date: Mar. 21, 1996

[30] Foreign Application Priority Data

Sep. 16, 1994 [EP] European Pat. Off. ............ 94306804.9
Feb. 28, 1995 [GB] United Kingdom ................. 9503939.2

[51] Int. Cl.⁶ ............................. H04M 3/42; H04Q 3/00
[52] U.S. Cl. ......................... 370/385; 370/522; 379/230
[58] Field of Search ................... 370/230, 235, 370/465, 522, 270, 271, 384, 385, 386; 379/219, 220, 229, 230, 231, 207

[56] References Cited

U.S. PATENT DOCUMENTS

| 5,526,415 | 6/1996 | Wakamoto | 379/230 |
| 5,572,583 | 11/1996 | Wheeler, Jr. et al. | 379/207 |
| 5,574,782 | 11/1996 | Baird et al. | 379/220 |
| 5,761,290 | 6/1998 | Farris et al. | 379/207 |

FOREIGN PATENT DOCUMENTS

0 454 332 10/1991 European Pat. Off. .
0 581 526 2/1994 European Pat. Off. .
0 608 612 8/1994 European Pat. Off. .

OTHER PUBLICATIONS

F.G. Oram et al. "Service Location Tradeoffs in Intelligent Networks", International Switching Symposium 90, vol. 4, May 28, 1990 Stockholm (Sweden), pp. 63–69.

D.C. Shrader et al. "Impact of AIN Architecture on Service Performance", Annual Review of Communications National Engineering Consortium, vol. 46, 1992 Chicago (US), pp. 663–669.

Masanobu Fujioka et al. "Consideration on Common Channel Signalling Evolution for Global Intelligent Networking", IEEE Journal on Selected Areas in Communications, vol. 12, No. 3, Apr. 1994 New York (US), pp. 510–516.

G.Y. Wyatt et al. "The Evolution of global Intelligent Network Architecture", AT&T Technical Journal, vol. 70, No. 3/4, 1991 New York (US), pp. 11–25.

*Primary Examiner*—Chi H. Pham
*Assistant Examiner*—Ricky Q. Ngo
*Attorney, Agent, or Firm*—Nixon & Vanderhye P.C.

[57] ABSTRACT

An intelligent network comprises switching units interconnected to provide connections between originating users and terminating users. The intelligent network includes a set of SCPs which can be accessed by the switching units through a signalling network. The SCPs contain individual service profiles which define the individual services provided to users of the network as originating users and individual service profiles which define the individual services provided to users as terminating users. During call set-up, a service control program which acts as agent for the originating user is generated from the service profile for the originating user as an originating user and a service control program which acts as agent for the terminating user is generated from the service profile for the terminating user as a terminating user. The two control programs then enter a dialogue with each other in order to generate call control instructions.

12 Claims, 5 Drawing Sheets

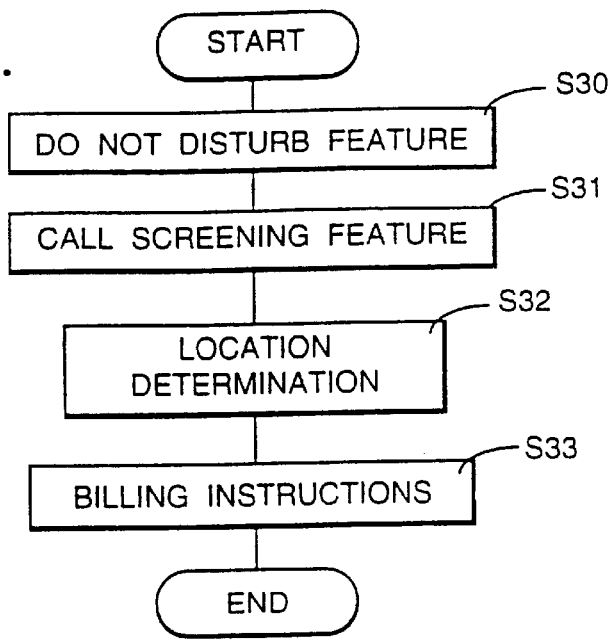
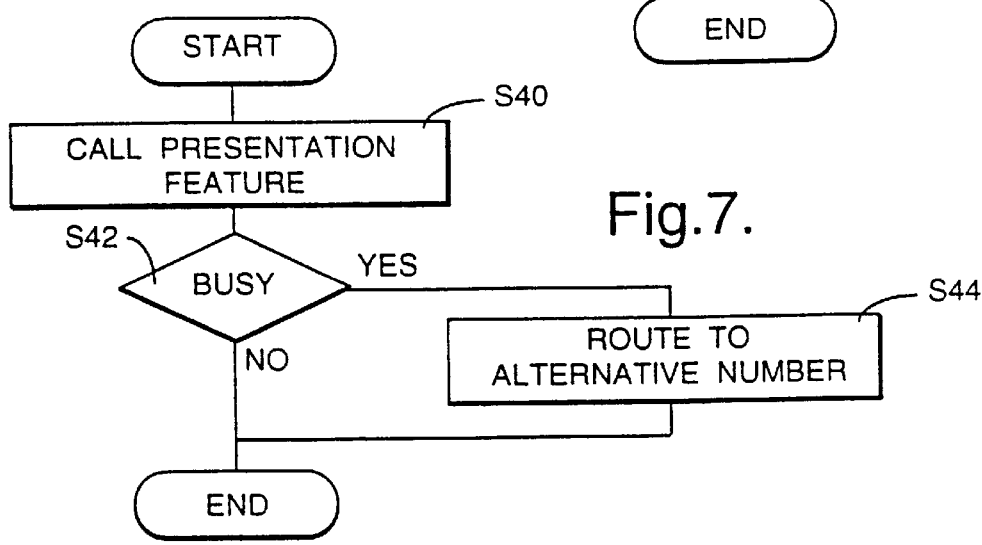
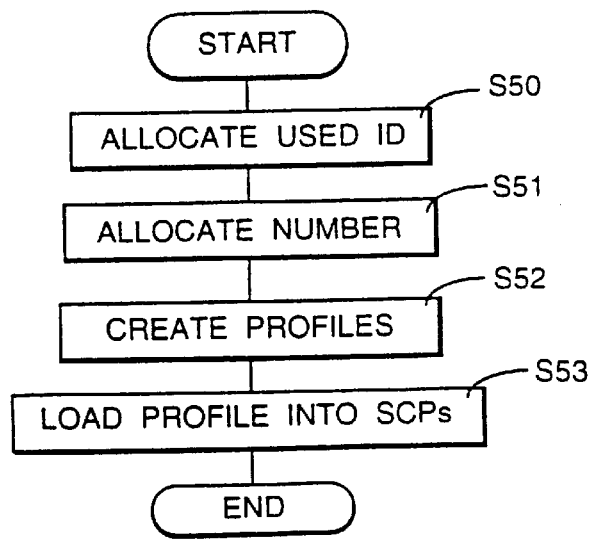

INTELLIGENT TELECOMMUNICATIONS NETWORK

This invention relates to an intelligent telecommunications network.

An intelligent telecommunications network comprises interconnected switching units which are arranged to connect calls between users of the network under the control of one or more intelligent units. A "user" may be a person, an item of equipment or another network and this term should be construed herein accordingly. Service control points and adjunct processors are examples of such intelligent units. When a switching unit is setting up a call in an intelligent network, it obtains call control instructions from an intelligent unit. The provision of one or more intelligent units enables additional features to be used during call set-up which are not available from the switching unit. There is a demand to increase the number of such features.

EP-A-O 618 612 shows a telecommunications network in which service processors calls on behalf of calling and called parties.

According to one aspect of this invention, there is provided a telecommunications network comprising interconnected switching units which are arranged to connect calls between originating and terminating users of the network, a plurality of individual intelligent units arranged in a distributed computing environment, and means for providing an interface between at least some of the switching units and said intelligent units, each intelligent unit including or having access to a set of service independent building blocks and a set of individual profiles of individual services provided to respective individual users of the network, some of the profiles relating to individual users of the network as individual originating users and others of the profiles relating to individual users of the network as individual terminating users, and each intelligent unit including means for combining data contained in an individual profile with appropriate ones of said building blocks to generate a service control program, whereby, at least during call set-up, a service control program generated from the individual profile of the services provided to the originating user as an originating user and acting as an agent for the originating user enters into a dialogue with a service control program generated from the individual profile of the services provided to the terminating user as a terminating user and acting as an agent for the terminating user in order to generate call control instructions.

By providing individual profiles of individual services provided to respective individual users as originating users are individual profiles of individual services provided to respective user as terminating users, a call may be set up in accordance with individual requirements of the originating and terminating users.

According to another aspect of the invention there is provided, in a telecommunications network comprising interconnected switching units which are arranged to connect calls between originating and terminating users of the network, a plurality of individual intelligent units arranged in a distributed computing environment, and an interface between at least one of the switching units and said intelligent units, each intelligent unit including or having access to a set of service independent building blocks and a set of individual profiles of individual services provided to respective individual users of the network, some of the profiles relating to individual users of the network as individual originating users and others of the profiles relating to individual users of the network as individual terminating users, a method of setting up a call between an originating user and a terminating user, said method comprising the steps of:

generating in one of said intelligent units a service control program by combining appropriate ones of said building blocks with data from the individual profile of individual services provided to the originating user as an originating user to act as an agent of the origination user;

generating in one of said intelligent units a service control program by combining data with appropriate ones of said building blocks with data from the individual profile of individual services provided to the terminating user as a terminating user to act as an agent of the terminating user; and causing the two services control programs to enter into a dialogue in order to generate call control instructions to set-up the call.

This invention will now be described in more detail, by way of example, with reference to the drawings in which:

FIG. 6 is a flow chart of an example of the steps which are used in generating call control instructions for setting up a call and which relate to the individual services provided to the terminating user for whom the call is intended;

FIG. 7 is a flow chart of an example of the steps which are used in generating call control instructions for completing a call; and FIG. 8 is a flow chart of the steps which are used in establishing a profile of the individual service to be provided to a user of the network.

Figure 1:
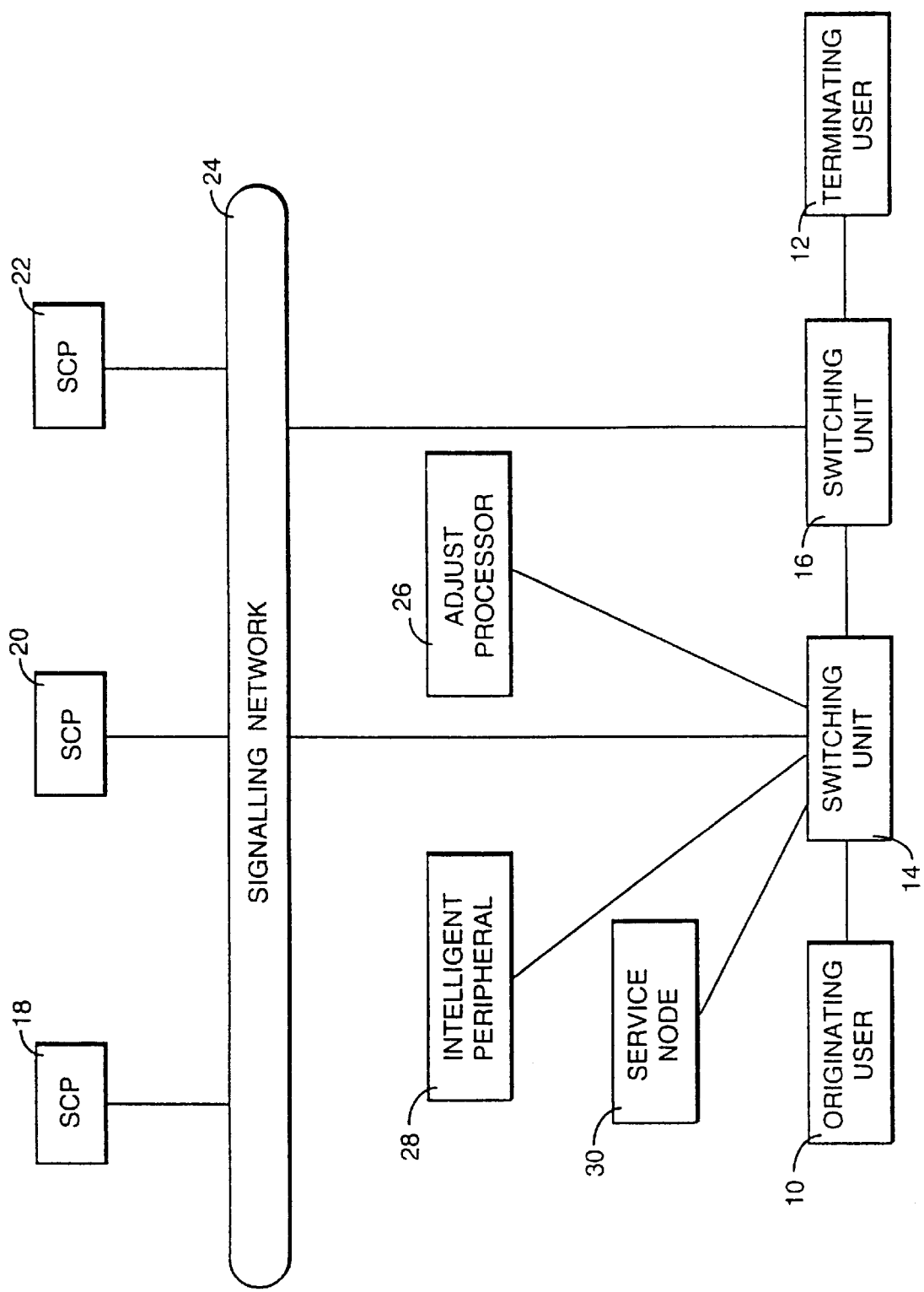
FIG. 1 is a block diagram of a known intelligent telecommunications network.

Referring now to FIG. 1, there is shown the general structure of an advanced intelligent network. Advanced intelligent networks having the general structure shown in FIG. 1 are already known. The advanced intelligent network of FIG. 1 is shown connecting a call between an originating user 10 and a terminating user 12. An originating user is a user of the network who is making a call and a terminating user is a user for whom a call is intended. Users may, of course, be both originating and terminating users in accordance with whether they are making or receiving calls. As set out above, a user may be a person, an item of equipment or another network. The network includes interconnected switching units for connecting calls between originating and terminating users. FIG. 1 shows two of these switching units, namely switching unit 14 and switching unit 16.

The switching unit 14 is accessed by the originating user 10 by an access network, not shown. The access network may include further switching units and may be an access network for fixed or mobile users. The switching unit 16 may be connected to the terminating user 12 by another access network.

The network includes three service control points (SCPs) 18, 20, 22, which are located remotely from the switching units 14, 16. Each of the SCPs 18, 20, 22 may be connected to the switching units 14, 16 and at least some of the other switching units through a signalling network 24. Thus, the signalling network 24 provides an interface between the SCPs and the switching units. Although not shown, the signalling network 24 is generally used for carrying call set up messages between the switching units.

The switching unit 14 is provided with an adjunct processor 26 and can access an intelligent peripheral 28 and a service node 30. The adjunct processor 26 is co-located with the switching unit 13 and connected to it through high-speed interfaces. Although not shown, the switching unit 16 and at least some of the other switching units are each provided with an adjunct processor and can access an intelligent peripheral and a service node.

Each of the SCPs 18, 20, 22 contains a service logic execution environment (SLEE) and one or more service control programs. Each service control program provides a particular intelligent network service either generally to users of the network or generally to a sub-set of the users. When a switching unit such as the switching unit 14 receives a request to set up an intelligent network call, it sends a query message to the appropriate one of the SCPs 18, 20, 22. The SLEE then executes the appropriate service control program and returns call control instructions to the switching unit. The switching unit uses the call control instructions to set up the call.

Examples of intelligent network services are the 0800 service provided by some network operators, an entertainment service and a virtual private network service provided to an organisation whose members form a sub-set of the users of the network.

In the 0800 service, a business may be allocated a number beginning with the prefix 0800 in addition to its normal network number and a user making a call to the 0800 number is not charged for the call. When a caller dials an 0800 number for a particular business, the switching unit, such as switching unit 14, accessed by the user sends a query message including the 0800 number to one of the SCPs. The SCP then executes the service control program for the 0800 service and sends call control instructions back to the switching unit. The call control instructions include the network number of the business and instructions to bill the call to that business.

In an entertainment service, a caller dials a number beginning with a prefix for that service and the user is then connected to equipment providing the entertainment service. The entertainment service might be playing a recording of a children's story to the user. The user pays a premium rate for the service. When a switching unit, such as switching unit 14, is accessed by a user who has dialled the number for an entertainment service, it sends a query message to an appropriate one of the SCPs. After executing the appropriate service control program, the SCP returns call control instructions to the switching unit. The call control instructions include the network number of the equipment providing the entertainment service and instructions to bill the user at the premium rate and to credit the provider of the entertainment service with a portion of the charge for the call.

In a virtual private network service, members of the organisation for whom the private network is provided are allocated private network numbers in accordance with a private numbering plan in addition to their normal network numbers. When a member of the organisation dials a private number and the call is received by a switching unit such as switching unit 14, the switching unit sends a query message to an appropriate one of the SCPs. The query message includes the private number dialled by the member of the organisation. The SCP executes an appropriate service control program and then sends call control instructions to the switching unit. The call control instructions include the normal network number of the member of the organisation for whom the call is intended. The switching unit 14 then uses the network number to set up the call.

Adjunct processor 26 is generally similar in construction to the SCPs 18, 20, 22 and thus contains an SLEE and one or more service control programs. However, it can be accessed only by switching unit 14 and thus the services which it supports are available only to originating users who can access the switching unit 14 for setting up a call. The intelligent peripheral 28 handles specialised transactions between a user of the network and the intelligent network itself. It has resources such as tones and announcements, voice recognition and voice synthesis.

The service node is capable of controlling intelligent network services in its own right as well as engaging in specialised interactions, such as those provided by the intelligent peripheral 28, between the network and its users. It is essentially a combined service control point and intelligent peripheral but may also have switching ability.

Service control programs are created in what is known as a service creation environment and which is remote from the SCPs. Each service control program is formed from a selection of service features and each service feature itself is formed from one or more service independent building blocks. International Telephone and Telegraphy Consultative Committee (CCITT) has defined forty service features and examples of these are call forwarding, reverse charging and split charging. The service independent building blocks represent service functions in the network that could be linked together in many different ways to provide the various service features. The service control program also includes data which is specific to the users of the network. For example, for the 0800 service, the data includes the translation between the 0800 numbers and the real numbers and also the instructions for billing the calls. After a service control program has been created, it is loaded into a service control point, adjunct processor or service node through a service management system.

From the above description of an intelligent network with reference to FIG. 1, it may be appreciated that, in such a network, service control logic may be contained in a SCP, adjunct processor or service node and thus in a unit which is separate from the switching unit. In this specification, the term "intelligent unit" should be construed as meaning a unit which contains service control logic and which is separate from the switching units.

For a more detailed description of advanced intelligent networks, reference may be made to: "Advanced Intelligent Networks—Now a Reality", by C D Sharpe and K Clegg, IEE Electronics and Communications Engineering Journal, June 1994, pages 153 to 162. This article is incorporated herein by reference.

Figure 2:
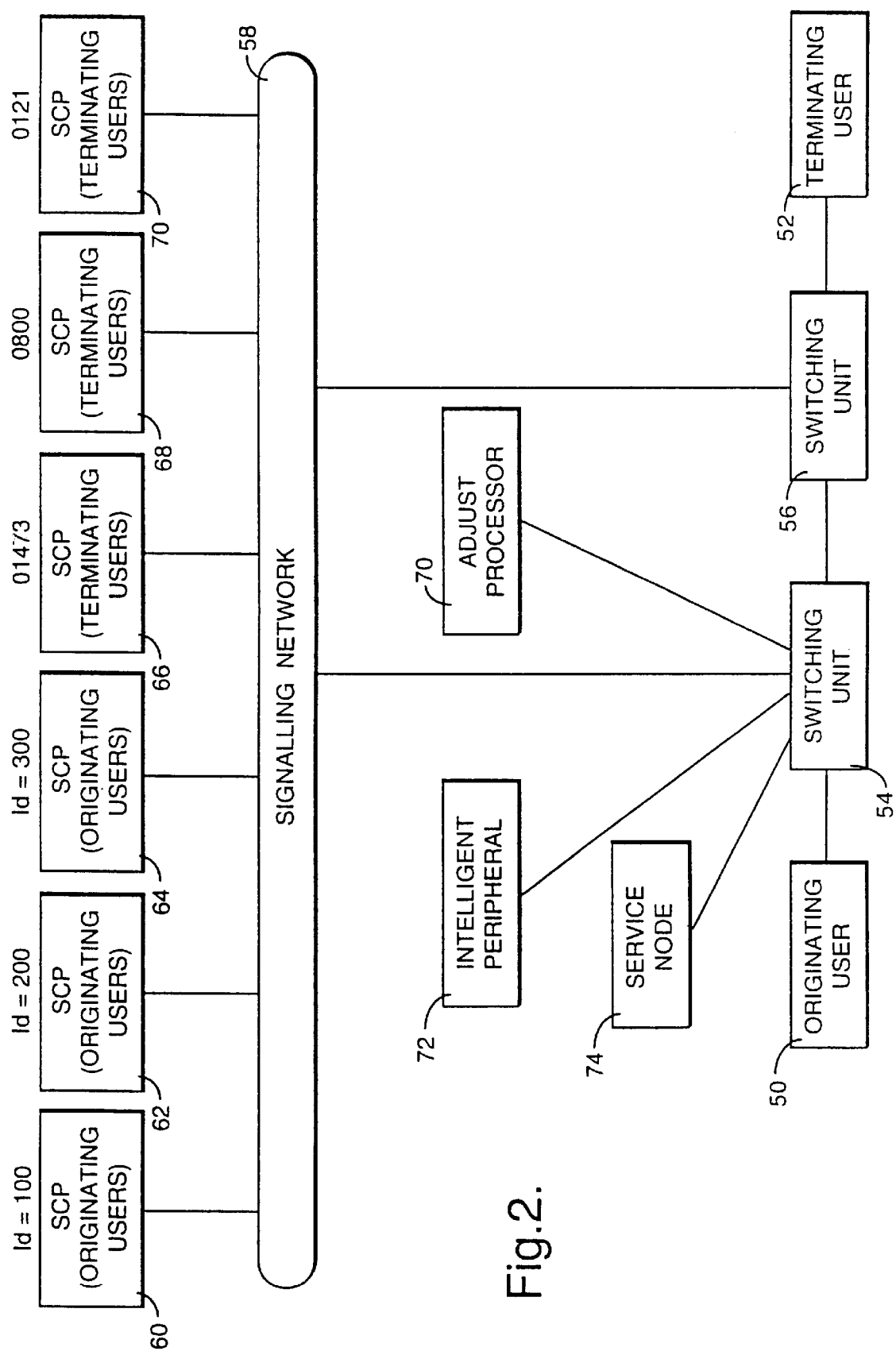
FIG. 2 is a block diagram of an intelligent telecommunications network embodying this invention.

Referring now to FIG. 2, there is shown an intelligent network embodying this invention. The network is shown connecting a call between an originating user 50 and a terminating user 52. The general structure of the network is similar to the network shown in FIG. 1. Thus, the network includes interconnected switching units for connecting calls between originating users and terminating users. Two of these switching units, namely switching unit 54 and switching unit 56 are shown in FIG. 2. The switching unit 54 can be accessed by users of the network such as originating user 50 through an access network and similarly the switching unit 56 can be accessed through an access network by users of the network such as the terminating user 52. One or more of the switching units may be connected to other networks.

The network includes a signalling network 58 which is responsible for transmitting call set-up messages between switching units. The network also includes six SCPs 60, 62, 64, 66, 68 and 70 which can be connected to some of the switching units, including switching units 54 and 56, through the signalling network 58. The switching unit 54 is provided with an adjunct processor 70 and can access an intelligent peripheral 72 and a service node 74. Adjunct processor 70 is co-located with the switching unit 54 and connected to it through high speed interfaces. Other switching units including the switching unit 56 are also provided with adjunct processors, and can access intelligent peripherals and service nodes.

As will be explained in more detail below, the SCPs 60, 62, 64, 66, 68 and 70 differ significantly in construction and operation from the SCPs 18, 20 and 22. Also, the SCPs 60, 62, 64, 66, 68 and 70 can be connected to each other through the signalling network 58 and are thus arranged in a distributed computing environment.

The switching units 54 and 56 may be digital switching units such as the System X exchange manufactured by GEC Plessy Telecommunications or an asynchronous transfer mode (ATM) switch.

The network may connect voice, data and video calls between originating and terminating users and the users may be mobile users or fixed users and may be individuals or equipment or other networks. The calls may be transmitted over both narrowband and broadband circuits.

With some exceptions, examples of which are mentioned below, each user of the network has a first service profile (an originating profile) which defines an individual set of services provided for the user as an originating user and a second service profile (a terminating profile) which defines an individual set of services provided for the user as a terminating user. Each profile is constructed in accordance with the specific requirements of the user and is individual and specific to the user. Each profile is formed from a specific and individual selection of available service features arranged in a specific and individual order of execution and data which is specific and individual to the user. In each profile the configuration of the features and their logical relationship to each other is also specific to the user. The originating profiles are used during call set-up. Each terminating profile is divided into two parts, namely, a first part which is used during call set-up and a second part which is used during call completion.

There will now be described two exceptions to providing a user with an originating profile and a terminating profile. A payphone in a public place may be arranged for outgoing calls only and therefore it would not need a terminating profile. Equipment providing an entertainment service would not need an originating profile.

Some of the users of the network are provided with user identifiers which are used when the users are originating users. A user may dial his user identifier (Id) when making a call before or after entering the called number. The provision of a user identifier enables the user to make a call from any location in any fixed or mobile network with the result that the call is processed with the individual service provided for that user as an originating user. In the case of users who have user identifiers, each service profile for a user as an originating user is stored in accordance with the user identifier. In the case of users who do not have user identifiers, each service profile for a user as an originating user is stored in accordance with the network number of terminal equipment normally used by the user. Service profiles for users as terminating users are stored in accordance with the telephone numbers of the users. These telephone numbers may be the normal network numbers of the users or special telephone numbers which are allocated to provide a particular service such as the 0800 service.

In FIG. 2, SCPs 60, 62 and 64 contain service profiles for users as originating users. SCPs 60, 62 and 64 contain, respectively, service profiles for users whose identifiers have prefixes 100, 200 and 300. In FIG. 2, SCPs 66, 68 and 70 contain service profiles for users as terminating users. SCP 66 contains service profiles for users whose telephone numbers have the prefix 01473, which in BT's UK public network is a prefix for calls to Ipswich. SCP 68 contains service profiles for users as terminating users whose numbers commence with 0800. Thus, SCP 68 contains service profiles used in the 0800 service. SCP 70 contains service profiles for users as terminating users whose telephone numbers begin with the prefix 021. In BT's UK public network, the prefix 0121 is used for calls to Birmingham.

Thus, in the intelligent network as illustrated in FIG. 2, the SCPs 60, 62 and 64 contain between them three groups of profiles for users as originating users and the SCPs 66, 68 and 70 contain between them three groups of profiles for users as terminating users. In practice, in a network having the size of BT's UK public network, a much larger number of groups of profiles will be needed to provide individual services for all the users of the network and the SCPs and the groups of profiles shown in FIG. 2 are merely illustrative of what is required. As some users do not have user identifiers, it will be necessary to provide groups of profiles for those users as originating users and stored with reference to the prefixes of their normal network numbers.

Although in FIG. 2 each SCP contains only one group of profiles, by way of modification a single SCP may contain more than one group of profiles. The profiles contained in such SCP may include both originating and terminating profiles.

By way of example, the features included in a service profile for a user as an originating user may include call screening, billing instructions, and abbreviated dialling. In call screening, outgoing calls having a destination number with a specific prefix or specified prefixes are barred. Billing instructions can specify the person or organisation who is to be billed for the call. For example, a user may be provided with a credit card and then all calls made by that user from any fixed or mobile phone are billed to that user. In abbreviated dialling, the user dials a number which is shorter and usually different from the normal telephone number of the terminating user. Examples of features provided in service profiles for users as terminating users include caller location, call screening, user busy, and billing instructions. The user location feature enables the user to be allocated a personal telephone number and then to receive calls dialled to that personal number when the user is known or predicted to be at a particular location. In call screening, the user specifies either telephone numbers from which a user is prepared to receive calls or telephone numbers from which the user refuses to receive calls. In the "busy" feature, the user specifies that at certain times the user is not prepared to receive calls. In the billing instructions feature, the user specifies that the charge for some or all incoming calls will be charged to a specified account number.

The profiles may be arranged in a hierarchical manner in which all members of a group of users are provided with certain common features and individual members of the group are provided with additional individual features. In the case of users, including other networks, who do not have individual service profiles, there may be provided default profiles.

Figure 3:
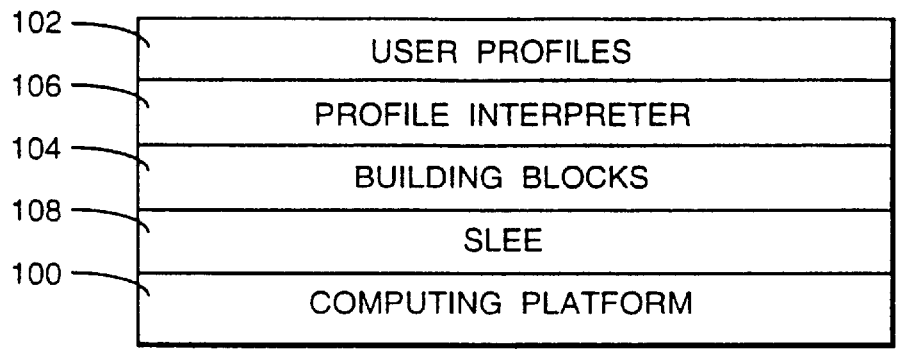
FIG. 3 is a block diagram of the software components of a service control point forming part of the intelligent network of FIG. 2.

Referring now to FIG. 3, there is shown the structure of one of the SCPs, for example SCP 60. The SCP shown in FIG. 3 comprises a computing platform 100, which takes the form of a computer provided with a suitable operating system, one or more groups of user profiles 102, a set of service independent building blocks 104, a profile interpreter 106 and an SLEE 108. The user profiles 102, building blocks 104, profile interpreter 106 and SLEE 108 are implemented as computer software. The user profiles 102 are essentially data.

Each of the user profiles 102 defines the features which are to be provided and the order in which they are to be executed and data relating to the user. For example, in the case of an originating user, the data may include the account details to which bills are to be sent. In the case of a terminating user, the data may include the current or predicted location of the user. The profile interpreter 106 is arranged to generate a service control program from a user profile and appropriate ones of the building blocks 104. The function of the SLEE 108 is to execute service control programs in order to generate call control instructions.

The SCP shown in FIG. 3 may be able to access a remote database to obtain data which is required in generating call control instructions. For example, where an SCP is providing automatic call distribution for a terminating user, the network number for the next call may be stored in a remote database. When the SCP is generating call control instructions for a call which is to be routed in accordance with the automatic call distribution service, the SCP accesses the automatic database to obtain the telephone number to which the call is to be routed.

Figure 4:
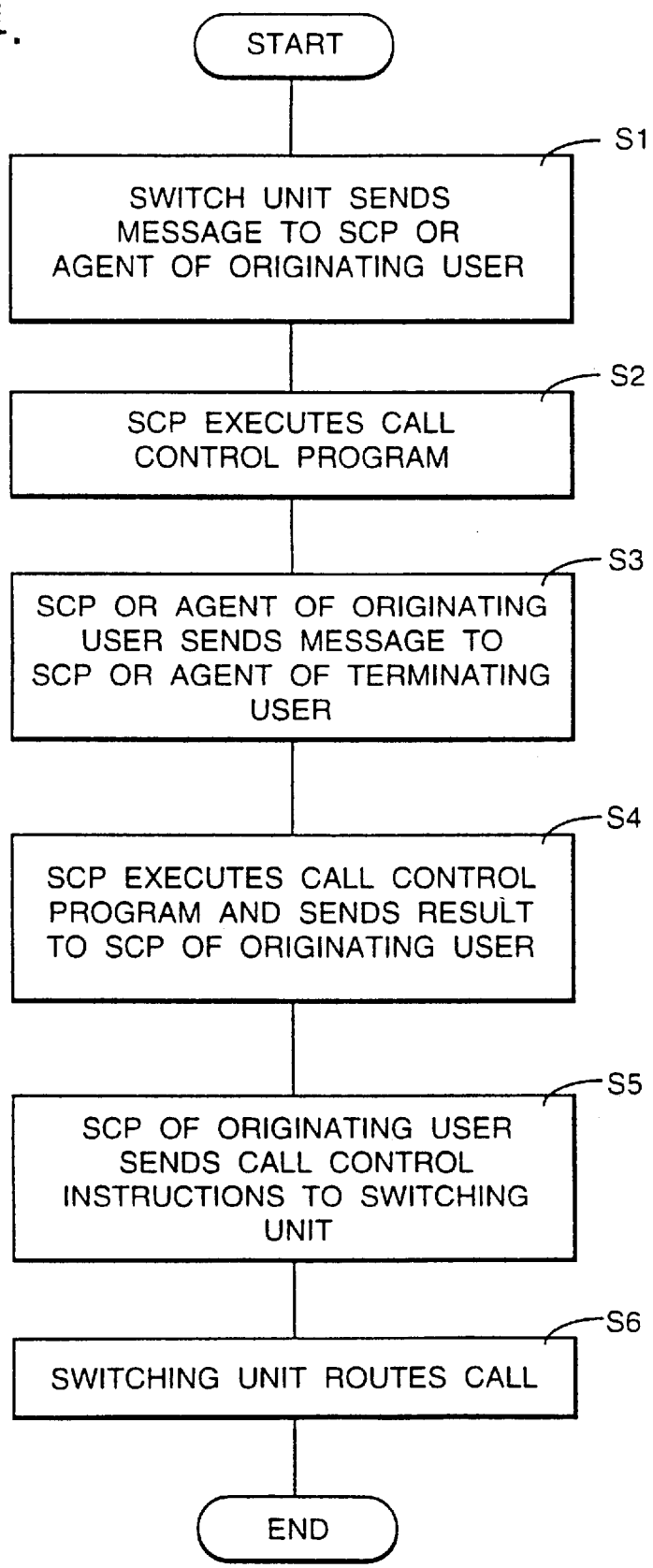
FIG. 4 is a flow chart of the steps which are used to set up a call in the intelligent network of FIG. 2.

Referring now to FIG. 4, there is shown a flow chart of the procedure which is used in setting up a call. Initially, an originating user such as the user 50 dials his user identifier and the telephone number of the terminating user to whom he wishes to be connected. The call is then received by a switching unit such as switching unit 54. In a step S1, the switching unit sends a query message to the SCP, for example, SCP 60, which contains the originating profile for the originating user. The SCP of the originating user creates a service control program from the profile of the originating user. The service control program thus acts as the agent of the originating user.

In a step S2, the SCP of the originating user executes the service control program and thus generates the call control instructions which are determined by the originating profile of the originating user.

Then, in a step S3, under the control of the service control program generated from the originating profile of the originating user, the SCP of the originating user sends a query message to the SCP, for example, SCP 66, of the terminating user. The SCP of the terminating user creates a service control program from the part of the terminating profile of the terminating user which is used during call set-up. This service control program thus acts as the agent of the terminating user.

Then, in a step S4, the SCP of the terminating user executes the service control program which it has just created and thus generates the call control instructions which relate to the terminating user. It transmits these call control instructions to the SCP of the originating user.

In a step S5, still under the control of the service control program generated from the originating profile of the originating user, the SCP of the originating user sends call control instructions to the switching unit from which it received the originating query message. The call control instructions include routing information. The routing information specifies the address of the switching unit which accesses the terminating user, for example switching unit 56 for terminating user 52, and the port on that switching unit which is used for connecting a call to the terminating user. Then, in a step S6, the switching unit which receives the call from the originating user, for example switching unit 54, routes the call to the switching unit which accesses the terminating user.

Figure 5:
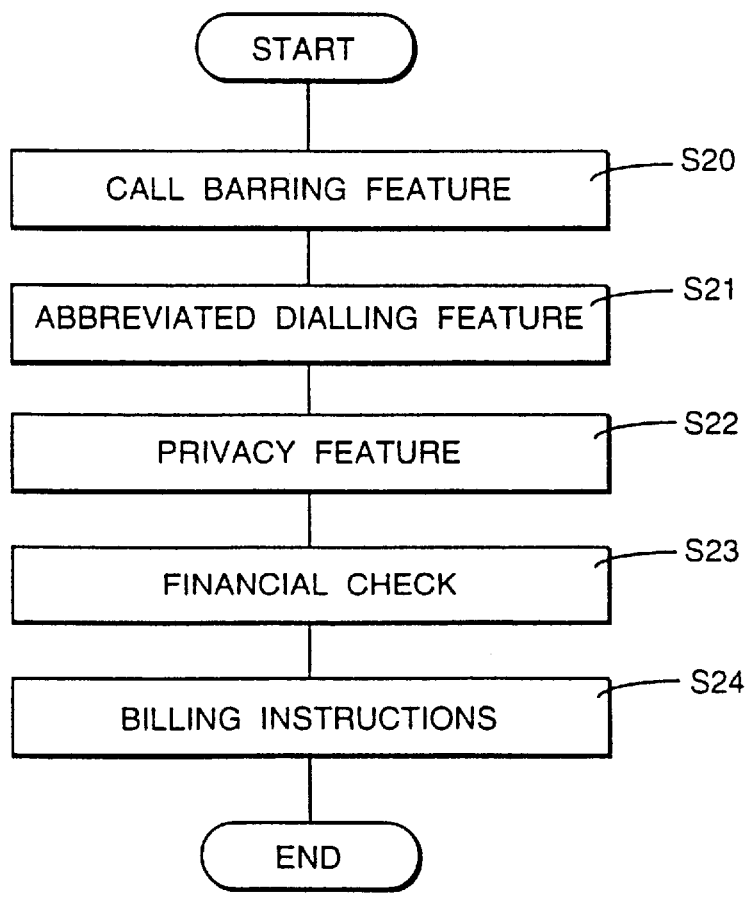
FIG. 5 is an example of steps which are used in generating call control instructions for setting up a call and which relate to the individual services provided to the originating user making the call.

Referring now to FIG. 5, there is shown a flow chart of an example of a service control program which may be generated from the originating profile of an originating user.

The service control program of FIG. 5 commences with a step S20 which executes a call barring feature. If it is found as a result of executing the call barring feature that the originating user is not allowed to make a call to the number which the user has dialled, the service control program generates a call control instruction to the switching unit to inform the user that the number is unobtainable.

If the user is not prevented from making a call to the number which the user has dialled, in a step S21 the service control program executes an abbreviated dialling feature. In the abbreviated dialling feature, the service control program translates the abbreviated dialling number dialled by the user into the full number of the desired terminating user. The full number is included in the eventual call control instructions.

Then, in a step S22, the service control program executes a privacy feature. In some public networks, terminating users are informed of the identity of originating users on receiving a call. The privacy feature provides the originating user with the option to withhold his identity. If the originating user has exercised this option, appropriate instructions are included in the eventual call control instructions.

Then, in a step S23, the service control program performs a financial check. The purpose of the financial check is to check if the originating user has exceeded the user's credit limit. If the user has exceeded the credit limit, then a call control instruction is generated and sent to the switching unit which then informs the user that the terminating user is unobtainable.

If the user has not exceeded the user's credit limit, in a step S24, a billing instructions feature is executed. This feature determines the account details to which the call is to be charged. These details are included in the eventual call control instructions.

Referring now to FIG. 6, there is shown an example of a service control program which is executed in accordance with the part of the terminating profile of a terminating user which is used during call set-up.

In a step S30, the program executes a "do not disturb" feature. The "do not disturb" feature provides the terminating user with the option to refuse all calls at specified times. If the terminating user has specified that calls are not to be received at the present time, the service control program sends a call control instruction via the SCP of the originating user to the switching unit of the originating user and which causes the switching unit to inform the originating user that the terminating user is unavailable.

If the terminating user is prepared to accept calls, in a step S31 a call screening feature is executed. The call screening feature enables the terminating user to specify that the user will accept calls from only certain specified numbers. If the call is from another number, the service control program generates a call control instruction which is sent via the SCP of the originating user to the switching unit of the originating user and which causes the switching unit to inform the originating caller that the terminating user is unavailable.

If the terminating user is available, in a step S32, the service control program executes location determination. Location determination can be used for various reasons. For example, in a mobile network, the location of each terminating user is likely to change frequently and the location of the user is tracked and held in a database. In a mobile network, the database is accessed to determine the present or predicted location of the terminating user. Location determination is also used for other reasons. For example, where the number dialled is the personal number of a terminating user and the present location of the terminating user is included in the data of the profile of the terminating user. As a result of executing step S32, the location of the terminating user is found and this is included as a routing instruction in the eventual call control instructions.

Then, in a step S33, a billing instructions feature is executed. For example, the terminating user may have the option to accept the charge for calls from certain specified originating users. If it is found in step S33 that the terminating user will accept the charge for the call, instructions to bill the call to the terminating user are included in the eventual call control instructions.

Referring now to FIG. 7, there is shown a flow chart of an example of a service control program which is executed in accordance with the part of the terminating profile of a terminating user which is responsible for call completion.

In a step S40, the program executes a call presentation feature. This feature provides the terminating user with the ability to present specified info to the originating user on call completion. For example, the originating user may receive a special ringing tone or special information may be presented to the originating user on the display on his handset. Where such information is to be provided to the originating user, appropriate instructions are included in the eventual call control instructions.

After step S40, a "busy" feature is executed in step S42. The "busy" feature enables the call to be routed to an alternative number in the event that the terminating user is unavailable. If the terminating user is busy, in a step S44, the routing information for the alternative number is found and included in the eventual call control instructions.

In the intelligent network shown in FIG. 2, the service profiles are contained in the SCPs. By way of modification, the service profiles may be contained in an adjunct processor or a service node. Where only one switching unit requires access to the service profiles in a network, it is sufficient for the adjunct processor containing the profiles to be connected to that switching unit through a high-speed interface. If other switching units require access to the service profiles, this may be achieved by providing additional high-speed interfaces between the other switching units and the adjunct processor. By way of further modification, service profiles may be provided in several adjunct processors and these may then be connected to each other in a distributed computing environment. High-speed interfaces are then provided between one or more of the adjunct processors and switching units to provide access to the service profiles.

In the example of the procedure for call set-up described above with reference to FIG. 4, the service control program which acts as the agent for the originating user enters into a simple dialogue with the service control program which acts as the agent for the terminating user. In this simple dialogue, the service control program for the originating user sends out a query message and receives call control instructions in return. The procedure may be modified to permit a more complex dialogue between the two service control programs which may also involve the originating and terminating users.

For example, the terminating user may require the originating user to enter a password before accepting the call. In this case, the service control program for the terminating user requests the service control program for the originating user to ask the originating user for the password. The service control program for the originating user then sends an appropriate call control instruction to the switching unit which then asks the originating user for the password. The originating user enters the password and this is then transmitted back to the service control program for the terminating user via the switching unit and the SCP which contains the service control program for the originating user. The service control program for the terminating user then checks the password and will only permit call set-up if the password is correct.

By way of another example, where both the originating and terminating users are equipment, the two service control programs may enter into a dialogue to establish a protocol for communicating with each other.

In the example described above with reference to FIG. 4, the call control program for the terminating user sends call control instructions to the service control program for the originating user. By way of modification, the call control program for the terminating user may instead, or in addition, export some of its program steps to the call control program for the originating user. These steps are then executed as part of the call control program of the originating user.

Where the terminating user is another network, the service control program for the originating user may enter into a dialogue with equipment in the other network during call set-up. For example, where the terminating user is a mobile network, the service control program for the originating user may enter into a dialogue with the home location register in the mobile network to obtain the location of the called party. The location is then transmitted to the originating user, who then has the option to terminate the call.

In the examples which have been described above, the service control programs for the originating and terminating users are used only during call set-up and completion. By way of modification, the service control programs may also supervise the call. For example, during progress of a call, in response to a request from either the originating or terminating user, one of the service control programs may add a third user to the call.

In the example of an SCP shown in FIG. 3, the profile interpreter 106 is arranged to generate a service control program for one of the user profiles 102 stored in the SCP. By way of modification, the user profiles may be stored remotely from the SCP. More generally, the service control programs acting as agents for the originating and terminating users may be executed on any computing platform which is capable of performing the function of an intelligent unit.

In the example described above, separate service control programs are generated for the originating and terminating users. By way of modification, a single service control program may be generated from the profiles for the originating and terminating users. The single service control program then acts as agent for both the originating user and the terminating user.

Referring now to FIG. 8, there is shown the procedure for creating profiles for a user of the network. The profiles are created in a service creation environment which is a computer system remote from the service control points of the network. In a step S50, an identifier is allocated to the user.

Then, in a step S51, a telephone number is allocated to the user. In a step S52, a profile is created for the user as an originating user and another profile is created for the user as a terminating user. The creation of each profile involves specifying which features are required and the order in which they are to be executed and providing the data which is specific to the user. An SCP is managed by an element manager which in turn is managed by a service management system. In step S33, each profile is loaded into an SCP via a service management system and the element manager for the SCP.

We claim:

1. A telecommunications network comprising interconnected switching units which are arranged to connect calls between originating and terminating users of the network, a plurality of individual intelligent units arranged in a distributed computing environment, and means for providing an interface between at least some of the switching units and said intelligent units, each intelligent unit including or having access to a set of service independent building blocks and a set of individual profiles of individual services provided to respective individual users of the network, some of the profiles relating to individual users of the network as individual originating users and others of the profiles relating to individual users of the network as individual terminating users, and each intelligent unit including means for combining data contained in an individual profile with appropriate ones of said building blocks to generate a service control program, whereby, at least during call set-up, a service control program generated from the individual profile of the services provided to the originating user as an originating user and acting as an agent for the originating user enters into a dialogue with a service control program generated from the individual profile of the services provided to the terminating user as a terminating user and acting as an agent for the terminating user in order to generate call control instructions.

2. A telecommunications network as claimed in claim 1, in which the service control program acting as an agent for the originating user and the service control program acting as an agent for the terminating user are separate service control programs.

3. A telecommunications network as claimed in claim 1, in which the service control program acting as an agent for the originating user and the service control program acting as an agent for the terminating user are the same service control program.

4. A telecommunications network as claimed in claim 1 in which, during call set-up, a switching unit responsible for call set-up sends a query message to the service control program acting as agent for the originating user, the service control program acting as agent for the originating user sends a query message to the service control program acting as agent for the terminating user, the service control program acting as agent for the terminating user sends a reply message to the intelligent unit acting as agent for the originating user, and the service control program acting as agent for the originating user sends call control instructions to the switch responsible for call set-up.

5. A telecommunications network as claimed in claim 4, in which, during call completion, a switching unit responsible for call completion sends a query message to the service control program acting as agent for the terminating user and the service control program acting as agent for the terminating user sends call control instructions to the switching unit responsible for call completion.

6. A telecommunications network as claimed in claim 4 in which, during call set-up, there is at least one further exchange of messages between the service control program acting as agent for the originating user and the service control program acting as agent for the terminating user.

7. A telecommunications network as claimed in claim 1, in which the dialogue between the service control program acting as agent for the originating user and the service control program acting as agent for the terminating user continues after call completion.

8. A telecommunications network as claimed in claim 1, in which each profile of the services provided to a user of the network as a terminating user comprises a first part which contains services relating to call setup and a second part which contains services relating to call completion.

9. A telecommunications network as claims in claim 1, in which each individual unit comprises a service control point, and said means for providing a interface comprises a signalling network.

10. In a telecommunications network comprising interconnected switching units which are arranged to connect calls between originating and terminating users of the network, a plurality of individual intelligent units arranged in a distributed computing environment, and an interface between at least one of the switching units and said intelligent units, each intelligent unit including or having access to a set of service independent building blocks and a set of individual profiles of individual services provided to respective individual users of the network, some of the profiles relating to individual users of the network as individual originating users and others of the profiles relating to individual users of the network as individual terminating users, a method of setting up a call between an originating user and a terminating user, said method comprising the steps of:

generating in one of said intelligent units a service control program by combining appropriate ones of said building blocks with data from the individual profile of individual services provided to the originating user as an originating user to act as an agent of the origination user;

generating in one of said intelligent units a service control program by combining data with appropriate ones of said building blocks with data from the individual profile of individual services provided to the terminating user as a terminating user to act as an agent of the terminating user; and causing the two services control programs to enter into a dialogue in order to generate call control instructions to set-up the call.

11. A method as claimed in claim 10, comprising the further step of causing the service control program which acts as an agent for the terminating user to generate call control instructions for use in call completion.

12. A method as claimed in claim 10, comprising the further step of causing the two service control program to maintain their dialogue after call completion in order to generate call control instructions for call supervision.

* * * * *